United States Patent [19]

Schnöring et al.

[11] 4,379,071
[45] Apr. 5, 1983

[54] PROCESS FOR THE PRODUCTION OF MICROCAPSULES

[75] Inventors: Hildegard Schnöring, Wuppertal-Elberfeld; Manfred Dahm, Bergisch-Neukirchen; Gottfried Pampus, Leverkusen, all of Fed. Rep. of Germany

[73] Assignee: Bayer Aktiengesellschaft, Leverkusen, Fed. Rep. of Germany

[21] Appl. No.: 664,908

[22] Filed: Mar. 8, 1976

Related U.S. Application Data

[63] Continuation of Ser. No. 448,247, Mar. 5, 1974, abandoned.

[30] Foreign Application Priority Data

Mar. 9, 1973 [DE] Fed. Rep. of Germany ..... 23117126

[51] Int. Cl.$^3$ ............................................. B01J 13/02
[52] U.S. Cl. .............................. 252/316; 71/DIG. 1; 252/522 A; 264/4; 427/221
[58] Field of Search ........................... 252/316; 264/4; 427/221

[56] References Cited

U.S. PATENT DOCUMENTS 3,726,804  4/1973  Matsukawa et al. ................ 252/316
3,796,669  3/1974  Kiritani et al. ...................... 252/316

FOREIGN PATENT DOCUMENTS 1025694  4/1966  United Kingdom ................ 427/221
1091076  11/1967  United Kingdom ................ 252/316

*Primary Examiner*—Richard D. Lovering
*Attorney, Agent, or Firm*—Connolly and Hutz

[57] ABSTRACT

Process for the production of microcapsules, characterized in that a reaction product of a diol or polyol which has a molecular weight of 400 to 10,000 with phosgene or a di- or polyisocyanate which contains at least two chloroformic acid ester or isocyanate groups per molecule is mixed with the substance with is required to be enveloped (core material) and this mixture, an at least bifunctional chain lengthening agent for the reaction product and an aqueous phase are introduced into a zone of high turbulence where the reaction product and chain lengthening agent react to form a high molecular weight polymer which encloses the substance which is to be enveloped to form microcapsules which are then separated.

14 Claims, 2 Drawing Figures

PROCESS FOR THE PRODUCTION OF MICROCAPSULES

CROSS-REFERENCE TO RELATED APPLICATION

This application is a continuation of application Ser. No. 448,247 filed Mar. 5, 1974 and now abandoned.

This invention relates to a process for the production of microcapsules.

The microencapsulation of organic and inorganic substances is already known in principle. It can be carried out, for example, by a process of interface polycondensation in which two low molecular weight reactants are dissolved in different liquids which are immiscible with each other, the two solutions are added together and the reactants react with each other at the interface to form a polymer (see. U.S. Pat. Nos. 3,575,882; 3,577,515 and 3,607,776).

In practice, microencapsulation is carried out by first preparing a stable emulsion in which the disperse phase comprises the material which is to be encapsulated and the solution of one of the low molecular weight reactants in a solvent and the continuous phase comprises a liquid which is immiscible with these substances. The preparation of this emulsion generally requires the use of emulsifying agents. The second reactant, dissolved in an organic solvent, is added to this emulsion. Envelopes consisting of the polymer formed by the reaction between the reactants are formed over a period of time, usually several hours, round the dispersed particles of the material which is to be encapsulated. Suitable pairs of reactants for this process are, for example, diisocyanates/diols; diisocyanates/diamines; dicarboxylic acid chlorides/diamines; disulphonyl chlorides/diamines or phosgene/diamines.

Encapsulation processes of the kind described above have several important disadvantages, one of which is that a stable emulsion must first be prepared. This is often difficult, especially since it is necessary to ensure that the dispersion is sufficiently stable so that it will not break down when the second component is added. Furthermore, there is little scope for variation of these processes because there is only a narrow choice of suitable reactants and the polymers which can be produced in this way are small in number and very similar to each other. Moreover, the low molecular weight reactants used are practically incapable of film formation and it is therefore necessary to use a large quantity of enveloping material for encapsulation. This means that only a small quantity of core material can be encapsulated in a large quantity of enveloping material.

It is an object of this invention to provide a new process for the production of microcapsules which is characterised in that a reaction product of a diol or polyol which has a molecular weight of 400 to 10,000 with phosgene or a diisocyanate or polyisocyanate which contains at least two chloroformic acid ester or isocyanate groups per molecule is mixed with the material which is to be enveloped (core material), and the resulting mixture, a chain lengthening agent which is at least bifunctional and an aqueous phase are introduced into a zone of high turbulence in which the reaction product and chain lengthening agent react together to form a high molecular weight polymer which envelops the core material to form microcapsules which are then separated. The reaction products of diols or polyols with diisocyanates or polyisocyanates which still contain isocyanate groups will hereinafter be referred to as "isocyanate prepolymers" and the corresponding reaction products with phosgene will be referred to as "chloroformic acid ester prepolymers". This process has important commercial advantages; in particular, the separate preparation of a stable emulsion is no longer necessary. Instead, an emulsion is prepared in the zone of high turbulence and this emulsion already undergoes reaction during its preparation and immediately thereafter. The whole time required for the production of the microcapsules is only a few seconds or, at the most, a few minutes. Moreover, the process is generally continuous so that maximum volume/time yields can be obtained. With the process according to the invention it is also possible to encapsulate substances which are sensitive to temperature and substances which are readily hydrolysed or oxidised because the process can be carried out at a low temperature and high velocity. The reaction products of diols or polyols with phosgene or with diisocyanates or polyisocyanates are generally film-forming so that only small quantities of enveloping material compared with the core material are required. Lastly, the properties of the enveloping material can be varied within very wide limits, for example hydrophilic envelopes are obtained by using a polyether with a high proportion of ethylene oxide units as the polyol with a molecular weight of 400 to 10,000 whereas envelopes which are easily degraded hydrolytically can be obtained, for example, by using polyesters of oxalic acid, malonic acid or succinic acid; envelopes which can be degraded by oxidation and envelopes with varying degrees of hardness and practically any desired melting range can be obtained by other suitable choice of starting materials. Particularly suitable reaction products of diols or polyols with phosgene or di- or polyisocyanates are obtained by reacting linear or branched polyols with excess quantities of isocyanate or phosgene, polymers which contain terminal isocyanate or chlorocarbonyl groups being then obtained. Polyols suitable for preparing the reaction products have a molecular weight of 400 to 10,000 preferably 1000 to 10,000 to 10,000 and contain from 2 to 8 hydroxyl groups per molecule. Polyesters, polyethers, polythioethers, polyacetals, polycarbonates and polyester amides are particularly suitable. Suitable polyesters are obtained, for example, by reacting polyhydric alcohols, preferably dihydric alcohols optionally with the addition of trihydric alcohols, with polybasic, preferably dibasic, carboxylic acids. Instead of the free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and may be substituted, e.g. with halogen atom, and/or unsaturated. The following are mentioned as examples: Succinic acid, adipic acid, suberic, azelaic acid, sebacic acid, phthalic acid, isophthalic acid, trimellitic acid, phthalic acid anhydride, tetrahydrophthalic acid anhydride, hexahydrophtalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethylterephthalate and bis-glycol terephthalate. The following are examples of polyhydric alcohols which may be used: ethylene glycol, propylene-1,2- and -1,3-glycol, butylene-1,4- and -2,3-glycol, hexane-1,6-diol, octane-1,8-diol, neopentyl glycol, cyclohexane dimethanol (1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol and sorbitol, methylglycoside, diethylene glycol, triethylene glycol, tetraethyleneglycol, polyethylene glycols, dipropylene glycol, polypropylene glycols, dibutylene glycol and polybutylene glycols. The polyesters may also contain a proportion of terminal carboxyl groups. Polyesters of lactones such as ε-caprolactone or of hydroxycarboxylic acids such as w-hydroxycaproic acid may also be used.

Suitable polyethers containing from 2 to 8, preferably 2 or 3 hydroxyl groups may be prepared, for example, by polymerising epoxides such as ethylene oxide, propylene oxide, butylene oxide, tetrahydrofuran, styrene oxide or epichlorohydrin, each with itself, e.g. in the presence of $BF_3$, or by addition of these epoxides either as mixtures of successively to starting components which contain reactive hydrogen atoms such as alcohols or amines, e.g. water, ethylene glycol, propylene-1,3- or -1,2-glycol, trimethylolpropane, 4,4'-dihydroxydiphenylpropane, aniline, ammonia, ethanolamine or ethylene diamine. Sucrose polyethers, e.g. those described in German Auslegeschriften Nos. 1,176,358 and 1,064,938, may also be used for the process according to the invention. It is frequently preferred to use those polyethers which contain predominantly primary hydroxyl groups (up to 90% by weight, based on all the hydroxyl groups present in the polyether). Polyethers which have been modified with vinyl polymers, e.g. the modified polyethers obtained by the polymerisation of styrene or acrylonitrile in the presence of polyethers (U.S. Pat. Nos. 3,383,351; 3,304,273; 3,523,093 and 3,110,695 and German patent specification No. 1,152,536) and polybutadienes which contain hydroxyl groups are also suitable. Among the polythioethers may be particularly the condensation products of thiodiglycol with itself and/or with other glycols, dicarboxylic acids, formaldehyde, aminocarboxylic acids or amino alcohols. The products obtained are either polythio mixed ethers or polythioether esters or polythioether ester amides, depending on the co-components. Suitable polyacetals are, for example, the compounds which can be obtained from glycols such as diethylene glycol, triethylene glycol, 4,4'-dihydroxy'ethoxy-diphenyl-dimethyl-methane, hexanediol and formaldehyde. Polyacetals suitable for the purpose of the invention may also be obtained by polymerising cycling acetals. The hydroxyl-containing polycarbonates used may be those known per se, e.g. those obtained by reacting diols such as propane-1,3-diol, butane-1,4-diol and/or hexane-1,6-diol, diethylene glycol, triethylene glycol or tetraethylene glycol with diaryl carbonates such as diphenylcarbonate or phosgene. The polyester amides and polyamides also include, for example, the predominantly linear condensates obtained from polybasic saturated and unsaturated carboxylic acids or their anhydrides and polyvalent saturated and unsaturated amino alcohols, diamines, polyamines and their mixtures. Polyhydroxyl compounds which already contain urethane or urea groups or modified or unmodified natural polyols such as castor oil, carbohydrates or starch may also be used. Addition products of alkylene oxides with phenol formaldehyde resins or with urea formaldehyde resins are also suitable for the purpose of the invention. Representatives of these classes of compounds which are suitable for the invention have been described, for example, in High Polymers, Vol. XVI, "Polyurethanes, Chemistry and Technology", published by Saunders-Frisch, Interscience Publishers, New York, London, Volume I, 1962, pages 32–42 and pages 44–45 and Volume II, 1964, pages 5–6 and 198 and 199 and in Kunststoff-Handbuch, Volume VII, Vieweg-Höchtlen, Carl-Hanser-Verlag Munich, 1966, e.g. on pages 45 to 71. The diisocyanates or polyisocyanates used for the reaction with the polyols (to form the so-called isocyanate prepolymers) may be aliphatic, cycloaliphatic, araliphatic, aromatic or heterocyclic polyisocyanates (see Ann. 562, pages 75 to 136), for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexyne (German Auslegeschrift No. 1,202,685); hexahydrotolylene-2,4- and -2,6-diisocyanate and any mixtures of these isomers; hexahydrophenylene-1,3- and/or 1,4-diisocyanate; perhydro-2,4'- and/or 4,4'-diisocyanate; phenylene-1,3- and -1,4-diisocyanate; tolylene-2,4- and -2,6-diisocyanate and any mixtures of these isomers; diphenylmethane-2,4'- and/or 4,4'-diisocyanate; naphthylene-1,5-diisocyanate; triphenylmethane-4,4',4''-triisocyanate; polyphenyl-polymethylene polyisocyanates (obtained by aniline-formaldehyde condensation followed by phosgenation in accordance with British patent specification No. 874,430 and 848,671); perchlorinated aryl polyisocyanates (see German Auslegeschrift No. 1,157,601); polyisocyanates which contain carbodiimide groups (see German patent specification No. 1,092,007); diisocyanates according to U.S. Pat. No. 3,492,330; polyisocyanates which contain allophanate groups (see British patent specification No. 994,890; Belgian patent specification No. 761,626 and Dutch patent application No. 7,102,524); polyisocyanates which contain isocyanurate groups (see German patent specifications Nos. 1,022,789; 1,222,067 and 1,027,394; German Offenlegungsschriften Nos. 1,929,034 and 2,004,048); polyisocyanates which contain urethane groups (see Belgian patent specification No. 752,261 and U.S. Pat. No. 3,394,164); polyisocyanates which contain acylated urea groups (see German patent specification No. 1,230,778); polyisocyanates which contain biuret groups (see German patent specification No. 1,101,394; British patent specification No. 889,050 and French patent specification No. 7,017,514); polyisocyanates which have been prepared by telomerisation reactions (see Belgian patent specification No. 723,640); polyisocyanates which contain ester groups (see British patent specification Nos. 956,474 and 1,072,956; U.S. Pat. No. 3,567,763 and German patent specification No. 1,231,688) and reaction products of the above mentioned isocyanates with acetals (see German patent specification No. 1,072,385).

The preparation of isocyanate prepolymers from polyols and isocyanates is already known (see R. Vieweg, A. Höchtlen, Kunststoff-Handbuch, Volume VII, Polyurethane, Carl-Hanser-Verlag, Munich, 1966, pages 84 and 85).

The isocyanate prepolymers may be used directly for encapsulation in the form in which they are obtained in their preparation but the monomeric isocyanates still present in them may also be removed by a process of distillation, e.g. by thin layer evaporation.

Preparation of the chloroformic acid ester prepolymers is carried out in known manner by reacting the polyols with excess phosgene.

The chain lengthening agents which react with isocyanate prepolymers and isocyanate and chloroformic acid ester prepolymers may be aliphatic, cycloaliphatic or aromatic glycols or amino glycols which contain hydroxyl groups or hydroxyl and amino groups or aliphatic, cycloaliphatic or aromatic amines.

The following are examples of such compounds: Ethylene glycol, diethylene glycol, triethylene glycol, propane-1,2-diol, propane-1,3-diol, dipropylene glycol, thiodiglycol, butane-1,2-, -1,3-, -2,3- and -1,4-diol, 3-chloropropane-1,2-diol, pentane-1,5-diol, 2-methylpentane-2,4-diol, 3-methylpentane, 2,4-diol, 2,2-dimethyl-propane-1,3-diol, butane-2-diol-(1,4), butyne-2-diol-(1,4), hexane-2,5-diol, cyclohexanediols, hexane-1,6-diol, N-methyl-diethanolamine, N-ethyl-diethanolamine, diethanolamine, diisopropanolamine, N,N'-bis-(3-aminopropyl)-ethylenediamine, N,N'-bis-(2-aminopropyl)-ethylenediamine, N,N'-bis-(2-aminoethyl)-ethylenediamine, N,N'-bis-(2-aminopropyl)-ethylene diamine, N,N'-bis-(2-aminoethyl)-ethylenediamine, 4,4'-dimethylamino-diphenylmethane, 4,4'-dimethylamino-3,3'-dimethyldiphenylmethane, hexanetriol, glycerol, triethanolamine, trimethylolpropane, pentaerythritol, hydrazine and hydrazine derivatives, tris-(hydroxyalkyl)phosphites, glucose, bisphenol A, 4,4'-diamino-diphenylmethane, 2,4- and 2,6-diaminotoluene or addition products (molecular weights generally 200 to 1500) of alkylene oxides such as ethylene oxide, propylene oxide or butylene oxide with low molecular weight compounds of this kind which contain active hydrogen atoms or with water.

The envelopes therefore contain urethane and/or urea groups in addition to the typical groups of the polymers such as ether and ester bonds. In principle, any pair of reactants may be chosen but the choice will depend on the reactivity of the two components, for example when using prepolymers obtained from aliphatic isocyanates which are slow to react, it is advisable to use aliphatic polyamines, which are highly reactive, whereas when using prepolymers obtained from highly active aromatic isocyanates it is advisable to combine these with less reactive compounds such as aromatic polyamines, glycols and aminoalcohols. The two reactants for producing the capsules may be used in quantities such that the reactive groups are present, either in less than stoichiometric quantities. The reaction proceeds particularly rapidly if the cross-linking low molecular weight components are used in excess whereas envelops exceptionally low melting ranges are obtained if these components are used in less than stoichiometric quantities.

The molar ratio of the reactive groups (isocyanates or chloroformic acid ester groups on the one hand and active hydrogen of the chain lengthening agent on the other) is preferably between about 1:0.8 and 1:1.8; it is particularly advantageous to use a molar ratio of 1:1.

The reaction velocity can also be influenced by the known catalysts used for polyurethane formation.

The following are examples of suitable catalysts:

1. Tertiary amines such as triethylamine, tributylamine, N-methylmorpholine, N-ethyl-morpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylaminoethyl)-adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole; diamine, N,N-dimethyl-β-phenylethylamine, 1,2-dimethylimidazole and 2-methylimidazole;

2. Tertiary amines containing hydrogen atoms which are reactive with isocyanate groups, e.g. triethanolamine, triisopropanolamine, N-methyl-diethanolamine, N-ethyldiethylanolamine, N,N-dimethylethanolamine and their reaction products with alkylene oxides such as propylene oxide and/or ethylene oxide;

3. Silaamines which contain carbon-silicon bonds such as those described e.g. in German patent specification No. 1,229,290 e.g. 2,2,4-trimethyl-2-silamorpholine or 1,3-diethylaminomethyltetra-methyl-disiloxane;

4. Bases which contain nitrogen, such as tetraalkylammonium hydroxides, alkali metal hydroxides such as sodium hydroxide, alkali metal phenolates such as sodium phenolate or alkali metal alcoholates such as sodium methylate and hexahydrotriazines 5. Organic metal compounds, in particular organic tin compounds, preferably tin(II) salts of carboxylic acids such as tin(II) acetate, tin(II) octoate, tin(II) ethylhexoate and tin(II) laurate and the dialkyl tin salts of carboxylic acids, e.g. dibutyl tin diacetate, dibutyl tin dilaurate, dibutyl tin maleate or dioctyl tin diacetate.

Other catalysts and details of their mode of action may be found in Kunststoff-Handbuch, Volume VII, published by Vieweg and Höchtlen, Carl-Hanser-Verlag Munich, 1966, in particular on pages 96 to 102.

The catalysts are generally used in quantities of from 0.001 to 10% by weight, based on the reactants.

The process according to the invention may be used for encapsulation of any solid or liquid substances provided that they are insoluble in water and inert towards the prepolymers and chain lengthening agents. The following are examples of substances which may be encapsulated: Flame retarding agents such as tris-chloroethylphosphate or tris-(2,3-dibromo-propyl)-phosphate, catalysts such as N,N'-dimethylbenzylamine, tin(II) octoate or dibutyl tin(IV) dilaurate, aliphatic, cycloaliphatic or aromatic glycols, polyols used for the preparation of polyurethane foams and polyurethane elastomers, plasticizers such as dioctylphthalate, plant protective agents, perfumes, inks or aliphatic and aromatic hydrocarbons such as petroleum hydrocarbons or benzene.

The aqueous phases used are preferably water or aqueous emulsifier solutions. The emulsifiers are generally used in quantities of from 0.1 to 1% by weight. The quantity of aqueous phase, based on the prepolymer, is preferably from 50 to 80% by weight.

So-called laminators (see Belgian patent specification No. 718,029) may also be used either in combination with or instead of the emulsifiers.

When carrying out the process of the invention, the substance which is to be encapsulated may first be dissolved or dispersed in the prepolymer, using up to 90% by weight of this substance, based on the quantity of prepolymer, preferably from 20 to 60% by weight. The process of dissolving or dispersing the material which is to be encapsulated can be facilitated by adding small quantities of water-soluble, inert organic solvents (e.g. acetone in quantities of 5 to 20% by weight, based on the prepolymer).

The chain lengthening agent may be partly or completely dissolved in the aqueous phase.

The mixture of prepolymer and material which is to be encapsulated, chain lengthening agent (if it is not dissolved in the aqueous phase) and the aqueous phase are then introduced separately from each other into the zone of high turbulence at a temperature at which all the reactants are liquid but which is not above the decomposition temperature of the starting materials and of the chain lengthened polymer produced. In order to observe these conditions it is frequently necessary to operate at excess pressure, at least at a pressure above the vapour pressure of the most volatile component. Temperatures of from 50° to 150° C. are preferably employed.

The temperature in the zone of high turbulence should in any case be above the melting point of the isocyanate prepolymer. Only then can products be obtained in the form of uniform spherical particles.

The zone of high turbulence in the context of this invention is generally a space through which at least 300 parts by volume of liquid are passed through for each part by volume of space per hour under conditions of vigorous mixing. The quantity of liquid passed through for each part by volume of the zone of turbulence per hour is preferably 1200 to 5400 parts by volume.

The zone of high turbulence is generally produced with the aid of known apparatus, for example a stirrer vessel with disc stirrer and flow breakers in which the ratio of the diameter of the vessel to the diameter of the stirrer is between 1:0.9 and 1:0.2. When this apparatus is used, separate introduction of the different components can be achieved by introducing one component (e.g. the aqueous phase plus chain lengthening agent) directly into the stirrer cone and the other component (e.g. the isocyanate prepolymer) into the hollow shaft of the stirrer so that the two components are rapidly emulsified and chain lengthening takes place in the already emulsified product.

The mixing power in a vigorously agitated stirrer vessel is generally $10^{-1}$ to $10^{-3}$ Watt/cm$^3$ and is higher in the stirrer cone itself and therefore sometimes sufficient to emulsify low viscosity prepolymers.

Pumps equipped with rotors are much more suitable for carrying out the process, mainly because the time of stay is strictly limited. Exceptionally vigorous mixing can be achieved within very short times of stay in rotary homogenization machines. These apparatus are therefore preferred. They have a very high rate of throughput. The specific mixing power of rotary homogenization machines is about 5–25 Watt/cm$^3$.

The process may be carried out by introducing the prepolymer which contains the material which is to be encapsulated the chain lengthening agent and the aqueous phase separately into the zone of turbulence. Alternatively, two of these components, e.g. the aqueous phase and the chain lengthening agent, may be mixed. This is to be recommended particularly if the chain lengthening agent is water-soluble. If desired, the reactants may also be introduced at various points into the zone of turbulence and the stream of one component may be subdivided into several partial streams, for example the prepolymer which contains the material which is to be encapsulated and the aqueous phase may be introduced at the beginning of the zone of turbulence and the chain lengthening agent may be introduced simultaneously at several points at the beginning, middle and/or end of the zone of turbulence. According to one particularly advantageous method of carrying out the process, all three components are passed through a zone of decreasing temperature after they have been mixed.

Since the chain lengthening reaction takes place rapidly at high temperatures, it is advisable to employ high temperatures in the zone of turbulence. In order to operate the reaction continuously at its optimum conversion rate and for example to vary the particle size of the product, the zone of turbulence may be associated with additional zones of turbulence operated at decreasing temperatures. For example, the first zone of turbulence may be kept at a temperature above the melting point of the starting materials and of the polyurethane produced while a following reaction zone may be kept at a temperature near the melting point of the polyurethane and of the prepolymer while a following cooling zone may be kept at a temperature below the softening temperature of the polyurethane or polyurethane urea. The polyaddition reaction may be stopped by washing the reaction mixture with acidified water.

The process of the invention will now be described in more detail with reference to two figures. The term "isocyanate prepolymer" used below refers to the mixture of isocyanate prepolymer or chloroformic acid prepolymer and the material which is to be encapsulated.

Figure 1:
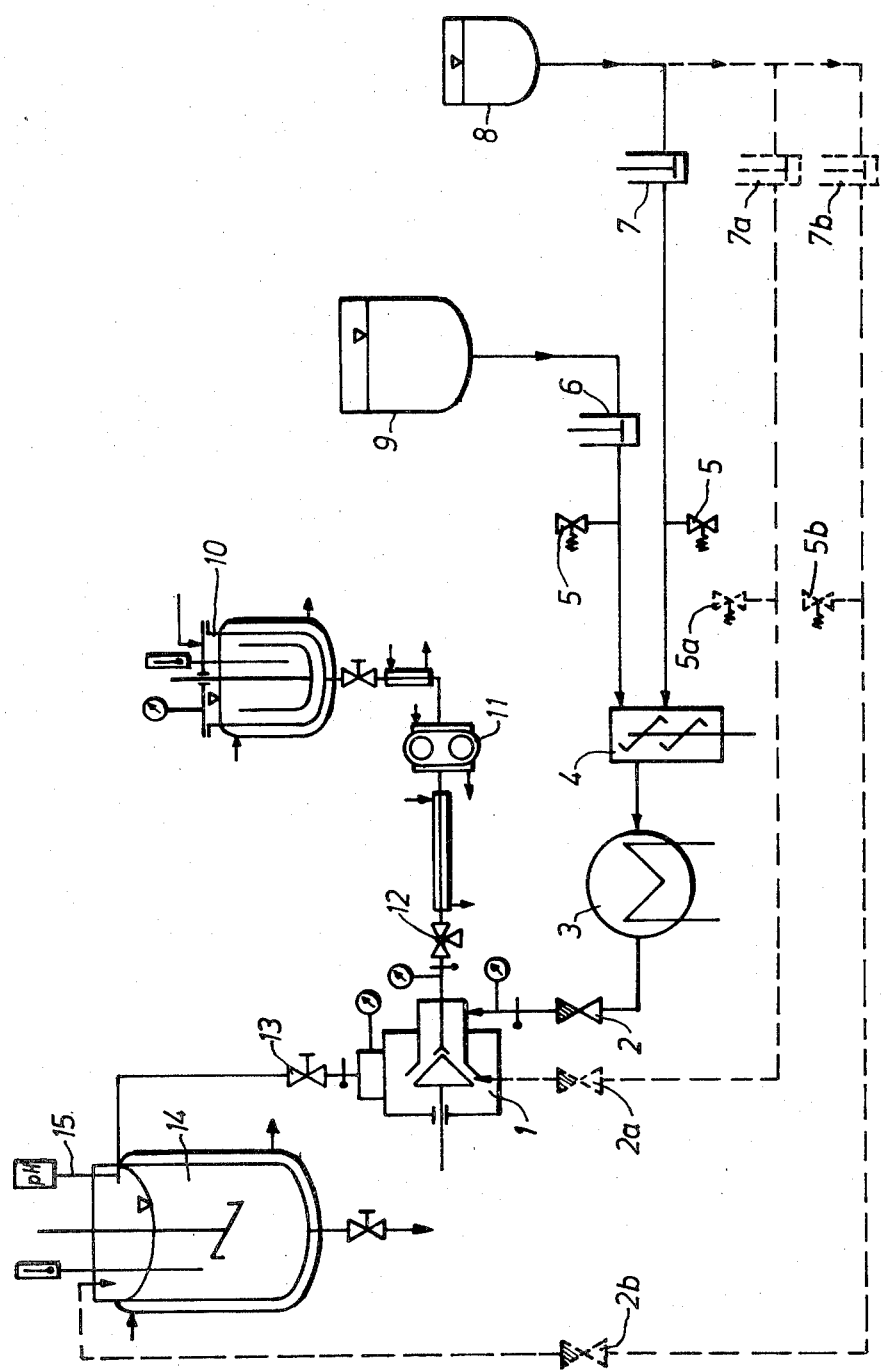
FIG. 1 shows an arrangement for carrying out the process using a gear wheel pump.

FIG. 1 shows an arrangement for carrying out the process. A mixing apparatus (1) is continuously supplied with an isocyanate prepolymer and the substance which is to be encapsulated from the storage tank (10) by way of the gear wheel pump (11) and valve (12) and at the same time with emulsifier and/or chain lengthening agent from storage tank (9) or (8) by way of piston delivery pumps (6+7), valves (5), mixing device (4), heat exchanger (3) and non-return valve (2). The isocyanate prepolymer is emulsified in the mixing apparatus (1), the prepolymer forming the disperse phase of the emulsion. The chain lengthening reaction of the prepolymer is also carried out in this apparatus by the simultaneous addition of the chain lengthening agent. After preparation of the emulsion in the mixing apparatus (1), the emulsion is transferred to the reaction vessel (14) by way of a pressure control valve (13) and pH meter (15).

The chain lengthening agent may also be introduced directly into the mixing apparatus (1) by way of the pump (7a) and non-return valve (2a) or a part may be introduced along one path and a part along the other (5a) being a safety valve. The pH is the governing parameter for controlling the reaction. The chain lengthening agent could be introduced into mixing apparatus (1) by way of pump (7b) and non-return valve (2b), (5b) being a safety valve.

Figure 2:
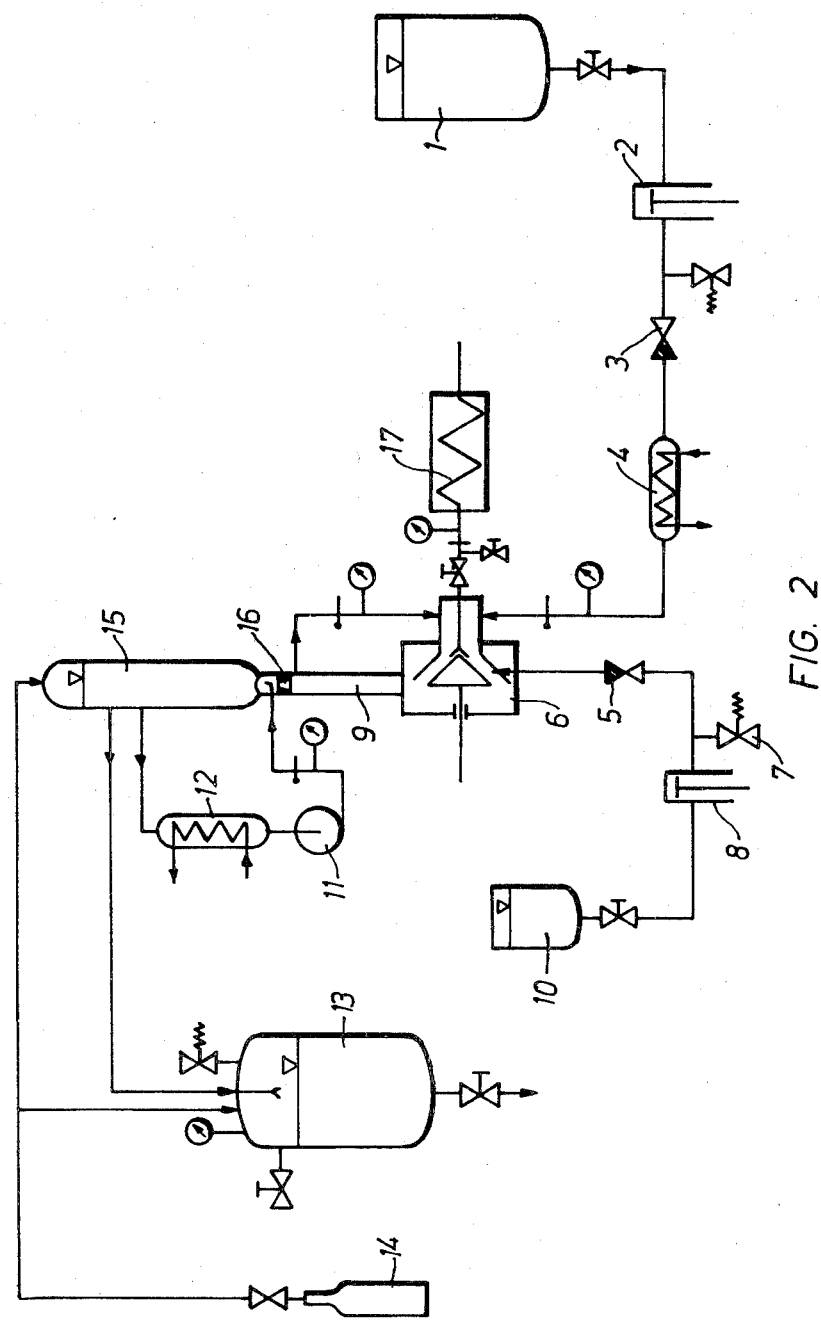
FIG. 2 shows an apparatus for carrying out the process using an extruder.

FIG. 2 shows another apparatus for carrying out the process. In this case, a mixing apparatus (6) is supplied simultaneously with isocyanate prepolymer and substance which is to be encapsulated from an extruder (17), with aqueous phase from the storage vessel (1) by way of a piston delivery pump (2), non-return valve (3) and heat exchanger (4) and with chain lengthening agent from storage vessel (10) by way of piston delivery pump (8) and non-return valve (5) (7) being a safety valve. The emulsion produced in the mixing apparatus (6) enters the reaction tube of the heating circuit (9). Part of the emulsion is recirculated from this tube into the mixing apparatus (6) and the remainder is transferred to the reaction tube of the cooling circuit (15) through the reducing aperture (16). Part of the contents of this tube is passed through the cooler (12) and rotary pump (11) to be cooled in the colling circuit and part is discharged through the tank (13). The whole plant is under the pressure of nitrogen which is introduced into the reaction tube (15) and tank (13) from the cylinder (14).

A dispersion of polymer particles which enclose the material which is required to be encapsulated is removed from the zone of turbulence of the apparatus described. The solid product can be isolated from these dispersions in the usual manner, for example the emulsion may be left to cream up, optionally in a centrifugal field, and the remaining water may then be removed in a conventional drying apparatus, e.g. a shelf drier or flow drier. A free flowing powder is then left, the particles of which envelop the material which is required to be encapsulated.

EXAMPLES

I. Examples for preparing isocyanate prepolymers

Method A 49.5 Parts by weight of hexamethylene-1,6-diisocyanate are added to 160.5 parts by weight of a trifunctional polyether of trimethylolpropane and propylene oxide which has a molecular weight of 300 and a hydroxyl number of 56 and the mixture is heated to a temperature of between 100° C. and 105° C. for 2.5 hours. A prepolymer which has an isocyanate group content of 9.3% and a viscosity of 700 centipoises at 25° C. is formed.

Method B

622 Parts by weight of hexamethylene-1,6-diisocyanate are added to 378 parts by weight of a trifunctional polyether of trimethylolpropane and propylene oxide which has a molecular weight of 450 and a hydroxyl number of 375 and the mixture is heated to a temperature of between 100° C. and 105° C. for 5 hours. A prepolymer which has an isocyanate content of 17.3% has been formed at the end of this time.

Method C

339 Parts by weight of a trifunctional polyether of glycerol, propylene oxide and ethylene oxide which has a molecular weight of 6000 and a hydroxyl number of 28 are mixed with 461 parts by weight of hexamethylene-1,6-diisocyanate and the mixture is heated to a temperature of between 100° C. and 105° C. for 5 hours. A liquid prepolymer with an isocyanate content of 21% has formed by the end of this time.

Method D 459.2 Parts by weight of a hexafunctional polyether of sorbitol, propylene oxide (77% by weight) and ethylene oxide (23% by weight) which has a molecular weight of 14000 and a hydroxyl number of 24 and a viscosity of 1778 centipoises at 25° C. are mixed with 340.8 parts by weight of hexamethylene-1,6-diisocyanate. The mixture is heated to a temperature of 120° C. for 6 hours. By the end of this time, a prepolymer which has an isocyanate content of 20.1% and a viscosity of 343 centipoises at 25° C. has been formed.

II. Examples for encapsulation.

General description (apparatus shown in FIG. 1)

180 kg/h of a mixture of isocyanate prepolymer and substance which is required to be encapsulated are supplied from the storage vessel (10) to the mixing apparatus (Supraton D 205, output 2000 l/h). At the same time, 700 l per hour of water from vessel (9) and a 20% by weight diamine solution from vessel (8) are supplied to the mixing apparatus by way of pumps (7) and (6) and mixer (4). The quantity of diamine used is calculated to adjust the molar ratio of amine groups to isocyanate groups to the required value. This ratio is defined by constants. The constant is obtained from the formula $$\frac{\text{mols of amino groups}}{\text{mols of isocyanate groups}} \times 100.$$

An aqueous dispersion of the capsules formed is removed from the mixing apparatus through valve (13) and collected in vessel (14). The dispersion may be freed from water in a fluidised bed drier. The capsules are then obtained in the form of a dry powder.

The experiments described above are summarized in the following table:

| Experiment No. | Prepolymer | NCO content % by weight | Encapsulated substance | Amine | Constant | Composition of the capsules Polymer % by weight | encapsulated substance % by weight | capsule size μ | of the dispersion capsules % by weight | water % by weight |
|---|---|---|---|---|---|---|---|---|---|---|
| 1 | A | 9.3 | a | EDA | 120 | 70 | 30 | 10–50 | 20 | 80 |
| 2 | B | 9.3 | b | EDA | 130 | 20 | 80 | 10–50 | 20 | 80 |
| 3 | B | 17.3 | a | EDA | 100 | 30 | 70 | 10–20 | 25 | 75 |
| 4 | A | 9.3 | c | EDA | 100 | 70 | 30 | 5–30 | 13 | 87 |
| 5 | A | 9.3 | d | EDA | 100 | 70 | 30 | 10–20 | 10 | 90 |
| 6 | C | 21 | c | EAS | 100 | 30 | 70 | 10–50 | 40 | 60 |
| 7 | C | 21 | d | EAS | 100 | 30 | 70 | 10–50 | 40 | 60 |
| 8 | C | 21 | e | EAS | 110 | 40 | 60 | 10–100 | 40 | 60 |
| 9 | C | 21 | f | EDA | 120 | 20 | 80 | 10–50 | 20 | 80 |
| 10 | C | 21 | c | EDA | 110 | 50 | 50 | 10–50 | 40 | 60 |
| 11 | C | 21 | d | EDA | 110 | 50 | 50 | 10–50 | 40 | 60 |
| 12 | D | 20.1 | g | EAS | 80 | 70 | 30 | 10–20 | 40 | 60 |

-continued

| Experiment No. | Prepolymer | NCO content % by weight | Encapsulated substance | Amine | Constant | Composition of the capsules | | capsule size μ | of the dispersion | |
|---|---|---|---|---|---|---|---|---|---|---|
| | | | | | | Polymer % by weight | encapsulated substance % by weight | | capsules % by weight | water % by weight |
| 13 | D | 20.1 | h | EAS | 100 | 30 | 70 | 5–15 | 40 | 60 |

EDA = ethylene diamine
EAS = ethylene diaminosulphonic acid sodium
a = leather perfume
b = mineral oil
c = (diethoxy-thiophosphoryl-oximino)-phenyl-acetonitrile
d = O,O—dimethyl-O—(4-nitrophenyl)-thiophosphate
e = N—dichlorofluoromethylthio-(dimethyl-sulphonamic acid anilide)
f = plasticizers
g = lavender perfume
h = trichloroethylphosphate.

We claim:

1. A process for the production of microcapsules containing solid or liquid substances, which are sparingly soluble in water, comprising the steps
    (a) continuously mixing material to be encapsulated with a product obtained by the reaction of a diol or a polyol having a molecular weight of from 400 to 10,000 with phosgene, a diisocyanate or a polyisocyanate, said product containing at least two chloroformic acid ester or isocyanate groups per molecule;
    (b) continuously introducing in separate streams into a zone of high turbulence the mixture from step (a), an aqueous phase and a chain lengthening agent, partially or completely dissolved in the aqueous phase, which is at least bifunctional and is an aliphatic, cycloaliphatic or aromatic glycol, an amino glycol or an aliphatic, cycloaliphatic or aromatic amine whereby flow through the zone of high turbulence is at least 300 parts by volume of liquid per unit volume of turbulent zone space per hour;
    (c) maintaining the zone of high turbulence at temperatures from 50° to 150° C. to thereby form a high molecular weight polymer which envelops the substance to be encapsulated and forms microcapsules; and
    (d) continuously removing the formed microcapsules from said zone of high turbulence.

2. A process as claimed in claim 1 in which the diol or polyol has a molecular weight of from 1,000 to 10,000.

3. A process as claimed in claim 1 in which the polyol contains from 2 to 8 hydroxyl groups per molecule.

4. A process as claimed in claim 1 in which the polyol is a polyester, polyether, polythioether, polyacetal, polycarbonate or polyester amide.

5. A process as claimed in claim 1 in which the molar ratio of of isocyanate or chloroformic acid ester groups to active hydrogen in the chain-lengthening agent is between 1:0.8 and 1:1.8.

6. A process as claimed in claim 5 in which the molar ratio of isocyanate or chloroformic acid ester groups to active hydrogen in the chain lengthening agent is 1:1.

7. A process as claimed in claim 1 in which the reaction mixture further contains a catalyst for urethane formation.

8. A process as claimed in claim 7 in which the quantity of catalyst is between 0.001 to 10% by weight, based on the reactants.

9. A process as claimed in claim 1 in which the aqueous phase is water or an aqueous emulsifier solution.

10. A process as claimed in claim 9 in which the emulsifier is used in a quantity of from 0.1 to 1% by weight.

11. A process as claimed in claim 1 in which the substance to be encapsulated is dissolved or dispersed in the reaction product, in a concentration of up to 90% by weight, based on the reaction product.

12. A process as claimed in claim 11 in which the substance which is to be encapsulated is dissolved or dispersed in the reaction product in a concentration of from 20 to 60% by weight.

13. A process as claimed in claim 1 wherein the throughput of liquid is from 1200 to 5400 parts by volume of liquid per unit volume of turbulent zone per hour.

14. The process of claim 1 wherein said chain lengthening agent is dissolved in said aqueous phase prior to introducing said aqueous phase stream into said zone of high turbulence.

* * * * *